(12) United States Patent
Kobayashi (10) Patent No.: US 10,754,597 B2
(45) Date of Patent: Aug. 25, 2020

(54) IMAGING FORMING APPARATUS AND CONTROL METHOD FOR RESTRICTING USE SETTINGS IN AN IMAGE FORMING APPARATUS

(71) Applicant: CANON KABUSHIKI KAISHA, Tokyo (JP)

(72) Inventor: Hiroaki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/259,639

(22) Filed: Jan. 28, 2019

(65) Prior Publication Data

US 2019/0235811 A1 Aug. 1, 2019

(30) Foreign Application Priority Data

Jan. 31, 2018 (JP) .................................. 2018-015724

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC .......... *G06F 3/1239* (2013.01); *G06F 3/1206* (2013.01); *G06F 3/1263* (2013.01); *H04N 1/0048* (2013.01)

(58) Field of Classification Search
CPC .... G06F 3/1239; G06F 3/1206; G06F 3/1263; H04N 1/0048
USPC ................................ 358/1.1, 1.15, 1.13, 1.14
See application file for complete search history.

(56) References Cited

U.S. PATENT DOCUMENTS

| | | | | |
|---|---|---|---|---|
| 2009/0080022 A1* | 3/2009 | Tsutsumi | ............... | G06F 3/1204 358/1.15 |
| 2014/0376023 A1* | 12/2014 | Anno | ................. | G06K 15/4065 358/1.14 |
| 2018/0367692 A1* | 12/2018 | Hikichi | ................. | G06F 3/1221 |

FOREIGN PATENT DOCUMENTS

JP 2010-108104 A 5/2010

\* cited by examiner

*Primary Examiner* — Douglas Q Tran
(74) *Attorney, Agent, or Firm* — Canon U.S.A., Inc., IP Division (57) ABSTRACT

An printing apparatus is provided that controls printing based on restriction settings. When the printing apparatus receives a reserved print job in a state in which a use restriction for a print function is set to enabled by a user, the reserved print job is controlled not to be executed regardless of the set use restriction.

16 Claims, 12 Drawing Sheets

IMAGING FORMING APPARATUS AND CONTROL METHOD FOR RESTRICTING USE SETTINGS IN AN IMAGE FORMING APPARATUS

BACKGROUND

Field

The present disclosure relates to an image forming apparatus and a control method for the image forming apparatus.

Description of the Related Art

Image forming apparatuses (multifunction peripherals (MFPs)) can perform settings (function restriction settings) for prohibiting the use of individual functions provided to the image forming apparatuses. For example, the image forming apparatuses can manage execution of print jobs using the function restriction settings. Specifically, in a case where a function restriction is set to a print function, the image forming apparatus does not execute a print job even if the image forming apparatus receives the print job.

Further, image forming apparatuses have reserved print functions of receiving reserved print jobs in which times to be printed are set by users and printing is started at the set times (hereinbelow referred to as reservation times). Specifically, for example, when a user outputs a large amount of print jobs in the daytime during which a usage frequency is high, other users cannot perform printing in some cases, so that the reserved print function is used when a print job is executed by setting the reservation time to a late-night time zone during which the usage frequency is low.

Japanese Patent Application Laid-Open No. 2010-108104 describes a following configuration. A print server receives a reserved print job, stores the received reserved print job, and transmits the reserved print job to an image forming apparatus when a reservation time comes. The image forming apparatus which receives the reserved print job executes the print job and outputs a print product.

Having received the reserved print job, the image forming apparatus displays a job name of the reserved print job in a reserved print job list and stores by the reservation time. Further, when the reservation time comes, the image forming apparatus confirms whether a function restriction setting is enabled or disabled and executes the reserved print job. In this regard, when the function restriction setting is enabled, the reserved print job may not be executed by the function restriction setting. In other words, when a user confirms that the reserved print job is received by the image forming apparatus by viewing display of the reserved print job list, the reserved print job may not be executed at the reservation time, and a desired output product may not be obtained.

SUMMARY

The present disclosure is directed to appropriate execution of control regarding a reserved print job which is received in a state in which a use restriction of a print function is set to enabled by a user.

As an aspect of the present disclosure, a printing apparatus which receives a reserved print job of which a printing time is specified and executes printing based on the reserved print job at the specified printing time includes a setting unit configured to set a use restriction for a print function by a user, and a control unit configured to, in a case where a print job which is received in a state in which the use restriction is set to enabled and of which a printing time is not specified, restrict execution of the print job based on the set use restriction and perform control not to execute a reserved print job which is received in a state in which the use restriction is set to enabled regardless of the set use restriction.

Further features will become apparent from the following description of exemplary embodiments with reference to the attached drawings.

DESCRIPTION OF THE EMBODIMENTS

Various exemplary embodiments of the present disclosure will be described in detail below with reference to the attached drawings. It is noted that the following exemplary embodiments are not meant to limit the scope of the present disclosure as encompassed by the appended claims. Further, not all combinations of features described in the exemplary embodiments are essential for solving means of the present disclosure.

Figure 1:
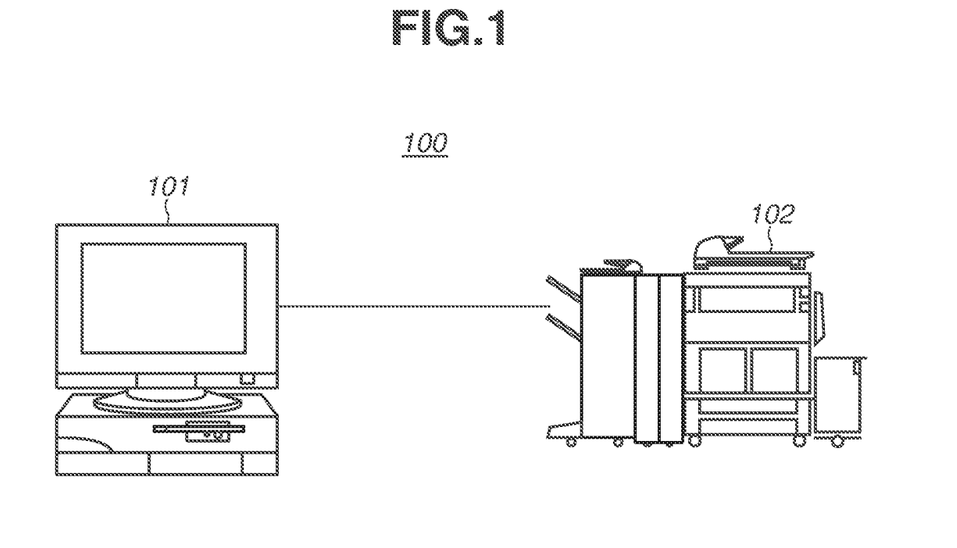
FIG. 1 illustrates an example of a system configuration of an image forming system.

FIG. 1 is a block diagram illustrating an example of a system configuration of an image forming system 100 according to a first exemplary embodiment. The image forming system 100 in FIG. 1 includes an image forming apparatus 102 and an information processing apparatus 101. The information processing apparatus 101 and the image forming apparatus 102 are connected to each other in a communicable manner. According to the present exemplary embodiment, the information processing apparatus 101 is connected to the image forming apparatus 102 via a network, however, a parallel cable, a serial cable, a Universal Serial Bus (USB) cable, and the like may be used for connection therebetween.

The information processing apparatus 101 obtains setting information for each function in the image forming apparatus 102. The information processing apparatus 101 can generate page description language (PDL) data and a print setting and transmit the generated PDL data and print setting to the image forming apparatus 102 as a print job or a reserved print job.

The image forming apparatus 102 manages the PDL data and the print setting received from the information processing apparatus 101 as the print job or the reserved print job. The image forming apparatus 102 executes the print job or the reserved print job to perform printing.

Figure 2:
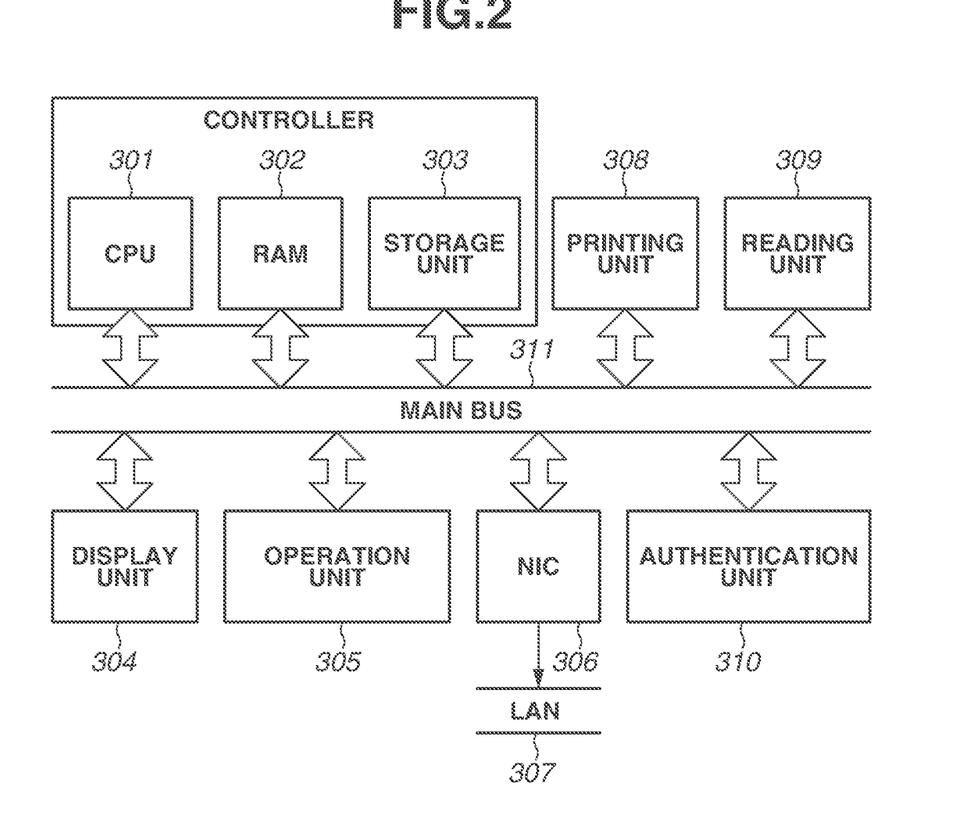
FIG. 2 illustrates an example of a hardware configuration of an image forming apparatus.

FIG. 2 illustrates an example of a hardware configuration of the image forming apparatus.

A central processing unit (CPU) 301 controls the image forming apparatus 102. A random access memory (RAM) 302 functions as a main memory, a work area, and the like of the CPU 301.

A storage unit 303 includes, for example, a hard disk (HDD), a floppy disk, and a compact disk read-only memory (CD-ROM). The storage unit 303 is used as a job storage area which stores an application program, font data, form data, and the like. The storage unit 303 also temporarily stores a print job, and allows a storage job to be externally controlled.

The CPU 301, the RAM 302, and the storage unit 303 function as a controller. Specifically, a program stored in the storage unit 303 is loaded to the RAM 302 and executed by the CPU 301.

A display unit 304 which is constituted of, for example, a liquid crystal display displays various information pieces (e.g., an error message) and notifies a user thereof.

An operation unit 305 which includes, for example, hard keys, receives an input by a user who seeks to use the image forming apparatus 102. The display unit 304 and the operation unit 305 are described as the different components, however, the present exemplary embodiment is not limited to this configuration. For example, the display unit 304 may be a touch panel, and the operation unit 305 may be soft keys displayed on the touch panel. Further, the operation unit 305 may include both of soft keys and hard keys.

A network interface card (NIC) 306 is used by the image forming apparatus 102 to mutually exchange data with another apparatus via a local area network (LAN) 307.

A printing unit 308 (a printer) prints image data obtained by converting PDL data received from the information processing apparatus 101 by a print processing unit 504 described below, image data generated by a reading unit 309 described below, and the like on a sheet. The printing unit 308 is connected to the CPU 301 by a printing interface (I/F) not illustrated. The CPU 301 controls the printing unit 308 via the printing I/F.

The reading unit 309 (a scanner) reads a document and generates monochromatic binary image data and color multi-valued image data. The reading unit 309 is connected to the CPU 301 by a reading I/F not illustrated. The CPU 301 controls an image signal input from the reading unit 309 via the reading I/F.

An authentication unit 310 performs log-in authentication (card authentication) by reading a card for identifying a user and log-in authentication (keyboard input authentication) based on input information input via the operation unit 305.

The CPU 301 controls the access between various devices via a main bus 311.

Figure 3:
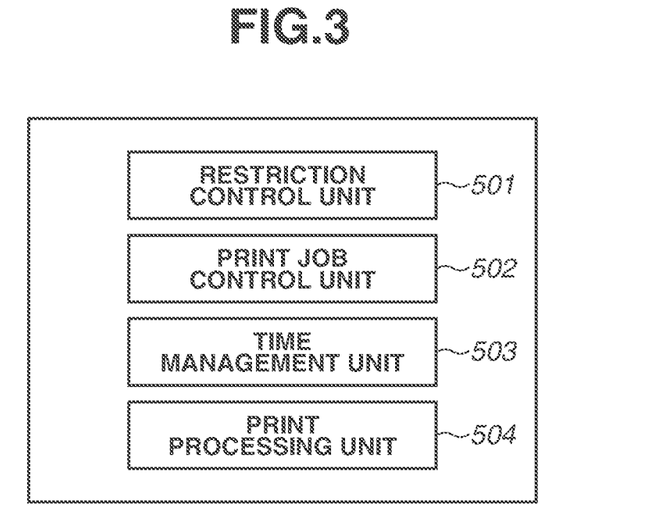
FIG. 3 illustrates an example of a functional configuration of the image forming apparatus.

FIG. 3 illustrates an example of a functional configuration of the image forming apparatus. The functional configuration of the image forming apparatus illustrated in FIG. 3 is controlled by the controller described with reference to FIG. 2.

A restriction control unit 501 controls the storage unit 303 to store information set on a setting screen 800 for function restriction illustrated in FIG. 6 which is described below.

A print job control unit 502 receives a print job transmitted from the information processing apparatus 101. When the print job received from the information processing apparatus 101 does not include printing time reservation setting data, the print job control unit 502 controls the storage unit 303 to store the print job as a normal print job. When the print job received from the information processing apparatus 101 includes the printing time reservation setting data, the print job control unit 502 controls the storage unit 303 to store the print job as a reserved print job. In addition, the print job control unit 502 performs control to cancel the received print job.

Further, the print job control unit 502 receives information of the reserved print job of which the reservation time comes among the reserved print jobs stored in the storage unit 303 from a time management unit 503 described below. The print job control unit 502 receiving the information controls the print processing unit 504 described below to process the reserved print job of which the reservation time comes.

The print job control unit 502 can retain the normal print job in the storage unit 303 and perform control based on a print instruction received from a user at an arbitrary timing.

The time management unit 503 compares a time stored in the image forming apparatus 102 with the reservation time set to the reserved print job and performs control to enable the information of the reserved print job of which the reservation time comes in the image forming apparatus 102 to be notified to the print job control unit 502.

The print processing unit 504 interprets PDL data pieces of the print job and the reserved print job and outputs the PDL data pieces to the printing unit 308 as bit map image data pieces. Further, the print processing unit 504 identifies states of a sheet feeding option (a sheet feeding cassette etc.) and a sheet discharge option (a finisher apparatus etc.) regarding printing processing and notifies the printing unit 308 of the states.

Figure 4:
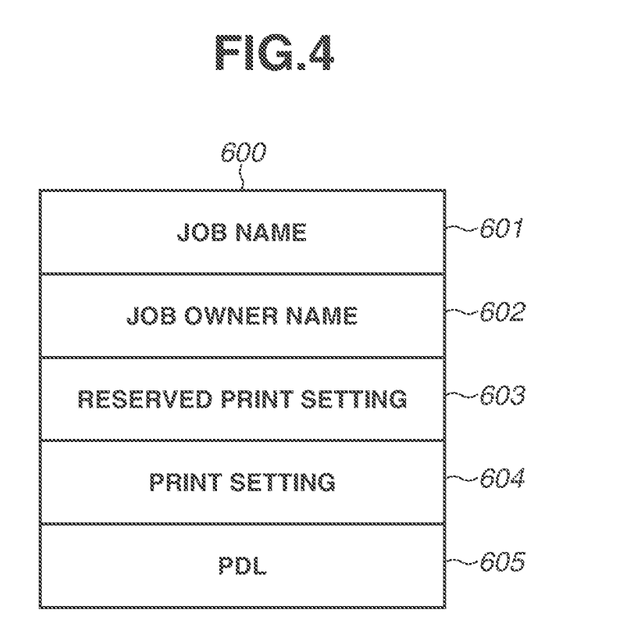
FIG. 4 illustrates an example of a print job generated by an information processing apparatus.

FIG. 4 illustrates an example of a print job 600 generated by the information processing apparatus 101.

The print job 600 is generated by a print driver of the information processing apparatus 101. The print job 600 includes job name information 601, a job owner name 602, reserved print setting information 603, print setting information 604, and PDL information 605.

The job name information 601 is a name of a generated print job. The job owner name 602 is information of a user who transmits the print job from the information processing apparatus 101.

The reserved print setting information 603 is information about a time to execute the reserved print set by a user. When the print job is not the reserved print job, the print job is in a state in which the reserved print setting information 603 is not set.

The print setting information 604 is information about the print setting to the print job. Specifically, the print setting information includes a setting of the number of copies, a sheet setting, a color/monochrome setting, an aggregation setting, and a one-sided/two-sided setting of the print job.

The PDL information 605 represents PDL data and is a language for generating bit map data.

Figure 5:
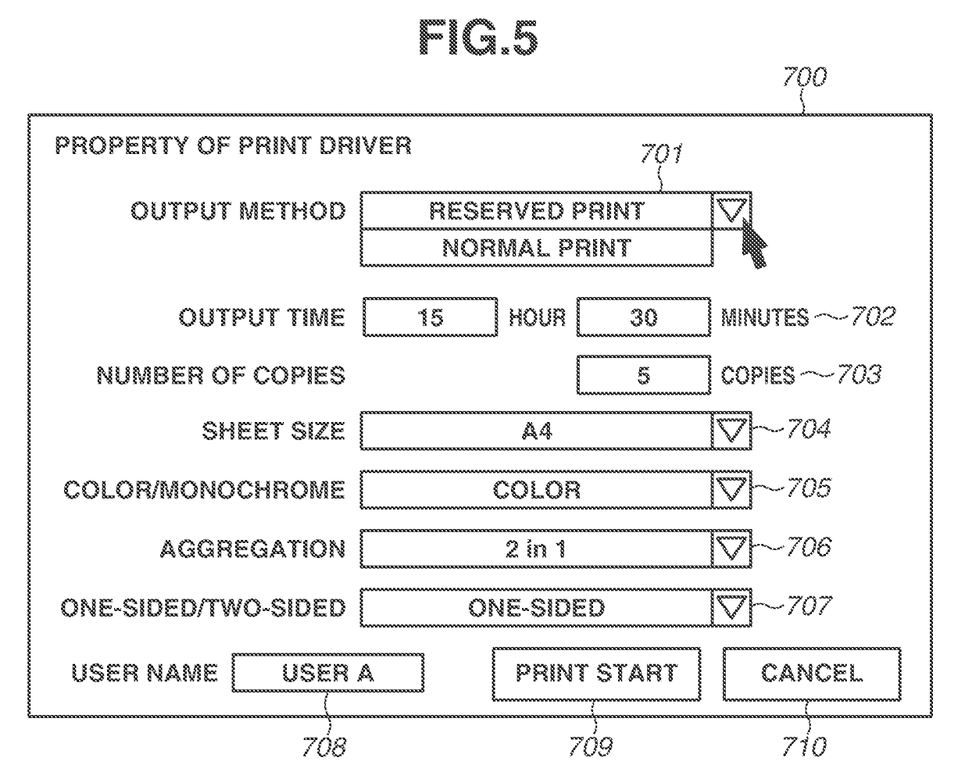
FIG. 5 illustrates an example of a property screen of a print driver operating on the information processing apparatus.

FIG. 5 illustrates an example of a property screen of the print driver operating on the information processing apparatus. A property screen 700 of the print driver is a screen on which a user can set an output method 701, an output time (hereinbelow referred to as a reservation time) 702, the number of copies 703, a sheet size 704, color/monochrome 705, aggregation 706, and one-sided/two-sided 707. An output method can be selected from a reserved print or normal print using the output method 701 as illustrated in FIG. 5.

The reservation time 702 is used to specify a print start time of the reserved print job. FIG. 5 shows an example in which hour and minute can be specified, however, year, month, and day may also be specified. In FIG. 5, the reservation time 702 is displayed only when the reserved print is selected in the output method 701.

A user name 708 is stored as the job owner name 602 of the print job 600. The number of copies 703 is used to set the number of print copies. The sheet size 704 is used to select a size of a sheet (e.g., A4, A3, and B4) used as a printing medium of image data. The color/monochrome 705 is used to select monochrome or color. The aggregation 706 is used to select a page aggregation setting (e.g., 1-in-1 and 2-in-1). The one-sided/two-sided 707 is used to select whether to perform printing on one side or on both sides of a sheet.

When a user selects a print start key 709, the print job 600 is transmitted from the information processing apparatus 101 to the image forming apparatus 102. In this regard, setting information of the input reservation time 702 is set to the reserved print setting information 603, and the setting information pieces of the number of copies 703, the sheet size 704, the color/monochrome 705, the aggregation 706, and the one-sided/two-sided 707 are set to the print setting information 604.

When the print start key 709 is selected in a state in which each of the reservation time 702 to the one-sided/two-sided 707 is not set, the print job is transmitted in a state in which nothing is set to the reserved print setting information 603 and the print setting information 604, namely an empty state. A print job which includes the reservation time 702 in the reserved print setting information 603 is the reserved print job, and a print job which does not include the reservation time 702 in the reserved print setting information 603 is the normal print job.

When a user presses a cancel key 710, each setting is cancelled, and the property of the print driver is closed.

The configuration in which the reservation time 702 is displayed only when the reserved print is selected in the output method 701 is described, however, the present exemplary embodiment is not limited to this configuration. For example, when the normal print is selected as the output method 701, the reservation time may be displayed in a state in which a user cannot perform setting by hatching thereon and the like.

Figure 6:
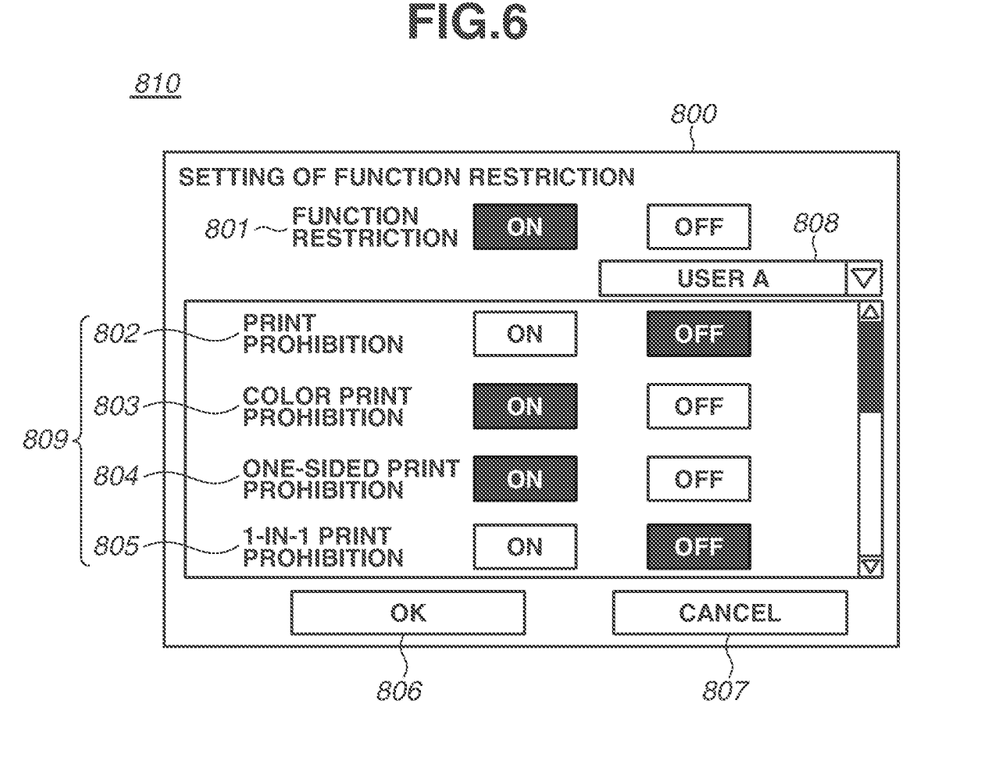
FIG. 6 illustrates an example of a function restriction setting screen of the image forming apparatus.

FIG. 6 illustrates an example of a function restriction setting screen of the image forming apparatus.

The setting screen 800 is a screen for setting function restriction to prohibit the use of an advanced setting 809 regarding a print function of the image forming apparatus 102. The setting screen 800 can be shifted from a management screen, which is not illustrated, of the image forming apparatus 102. Settings in the setting screen 800 are performed by a user who has administrator authority.

In the setting screen 800, whether to enable (ON) or disable (OFF) the function restriction in the image forming apparatus 102 can be set by a function restriction setting 801. The setting of the function restriction setting 801 is set to the image forming apparatus 102 and is common to each user who uses the image forming apparatus 102.

When the function restriction setting 801 is enabled, the use of the advanced setting 809 regarding the print functions is prohibited. The advanced setting 809 includes a print prohibition setting 802 and settings regarding a plurality of the print functions (prohibition settings of a part of functions). The prohibition settings of a part of functions includes, for example, a color print prohibition setting 803, a one-sided print prohibition setting 804, and a 1-in-1 print prohibition setting 805.

The print prohibition setting 802 is a setting for prohibiting printing. The color print prohibition setting 803 is a setting for prohibiting color printing. The one-sided print prohibition setting 804 is a setting for prohibiting one-sided printing. The 1-in-1 print prohibition setting 805 is a setting for prohibiting printing only one page on one sheet (1-in-1).

When the print prohibition setting 802 is enabled, the color print prohibition setting 803, the one-sided print prohibition setting 804, and the 1-in-1 print prohibition setting 805 which are prohibited as a result may be hidden.

A user selection tab 808 is a tab for selecting a user. A user is selected, and thus the advanced setting 809 in a case where the function restriction setting 801 is enabled can be stored by being associated with the selected user.

When a user presses an OK button 806, the restriction control unit 501 stores the function restriction setting 801 and the setting information pieces in the advanced setting 809 corresponding to the user as function restriction information 810 in the storage unit 303. When a user presses a cancel button 807, each of the selected settings is discarded and the screen returns to the previous screen.

When the function restriction setting 801 is disabled, each print function can be used regardless of the settings in the advanced setting 809 regarding the print functions.

FIG. 6 illustrates the configuration for setting the function restriction setting 801 to prohibit the use of the settings regarding the print functions of the image forming apparatus 102, however, the configuration is not limited to this one. The function restriction setting 801 may be set to prohibit use of settings regarding other functions of the image forming apparatus 102 in addition to prohibiting the use of the settings regarding the print functions of the image forming apparatus 102. Specifically, the function restriction setting 801 may prohibit, for example, not only the settings regarding the print functions but also advanced settings regarding a SEND function and other functions. In such a case, the advanced setting 809 includes a prohibition setting regarding the SEND function.

Next, a sequence diagram illustrating communication and processing among a user, the image forming apparatus, and the information processing apparatus according to the present exemplary embodiment is briefly described with reference to FIG. 7.

In step S1101, the user issues a transmission instruction of a print job to the information processing apparatus 101 by selecting the print start key 709 on the print driver property screen 700 illustrated in FIG. 5. Upon completion of the processing in step S1101, the processing proceeds to step S1102.

In step S1102, the information processing apparatus 101 transmits the print job 600 to the image forming apparatus 102. Upon completion of the processing in step S1102, the processing proceeds to step S1103.

In step S1103, the image forming apparatus 102 receives the print job 600 (e.g., a document 3) which is transmitted by the information processing apparatus 101 in step S1102. Upon completion of the processing in step S1103, the processing proceeds to step S1104.

In step S1104, the image forming apparatus 102 determines whether the print job 600 received in step S1103 is the reserved print job. In following steps, a case is described in which the print job 600 is determined as the reserved print job in step S1104. Upon completion of the processing in step S1104, the processing proceeds to step S1105.

In step S1105, when the image forming apparatus 102 detects that the function restriction setting 801 set on the setting screen 800 for the function restriction is "enabled", the processing proceeds to step S1106.

In step S1106, the image forming apparatus 102 cancels the reserved print job. The processing in steps S1104 to S1106 is performed before the reservation time comes. In particular, it is desirable that the processing in steps S1104 to S1106 is performed in response to reception of the reserved print job.

Next, in step S1107, the user requests the image forming apparatus 102 to display a reserved print job list screen 1500 illustrated in FIG. 8 described below so as to confirm whether the reserved print job is received in the image forming apparatus 102.

In step S1108, the image forming apparatus 102 displays the reserved print job list screen 1500 (FIG. 8) in which the reserved print job is displayed in a list. In the reserved print job list screen 1500, the reserved print job received in step S1103 is not displayed. It is because the reserved print job is cancelled in step S1106.

In step S1109, the user checks the reserved print job list screen 1500 displayed on the image forming apparatus 102. The user recognizes that the reserved print job is disabled since the transmitted reserved print job is not displayed on the reserved print job list screen 1500.

According to the above-described configuration, the user can find that the reserved print job is cancelled in the image forming apparatus 102 before the reservation time comes.

The reserved print job is cancelled before the reservation time comes and is not displayed in the reserved print job list when the function restriction setting 801 is enabled, and thus the user can recognize that the reserved print job is cancelled before the reservation time.

Figure 7:
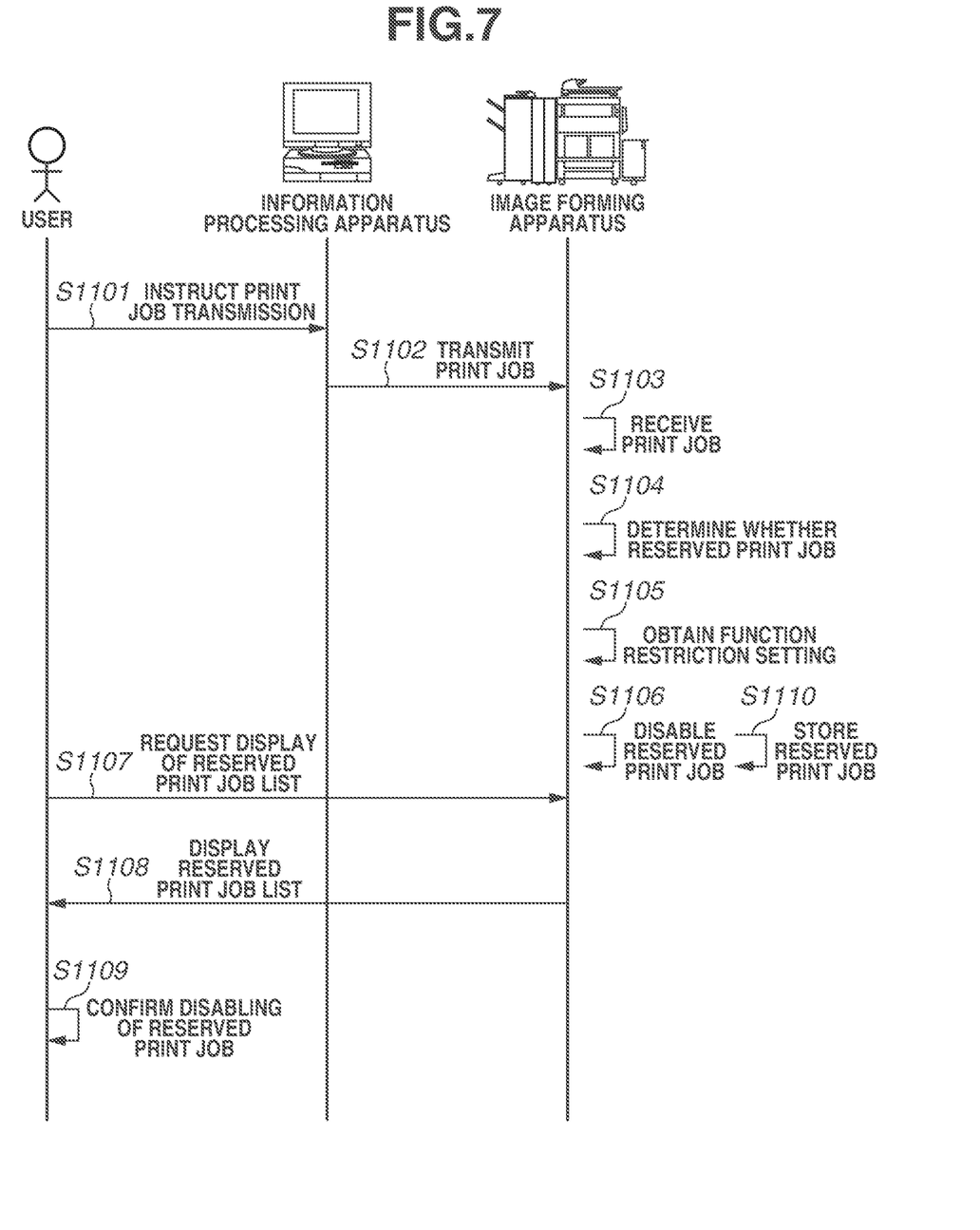
FIG. 7 is a sequence diagram illustrating a user, then image forming apparatus, and the information processing apparatus.

In step S1107 in FIG. 7, the user may request the image forming apparatus 102 to display the reserved print job list via the information processing apparatus 101. In this case, in step S1108, the image forming apparatus 102 may transmit the reserved print job list to the information processing apparatus 101, and the information processing apparatus 101 may display the reserved print job list.

Further, in step S1105 in FIG. 7, if the image forming apparatus 102 determines that the function restriction setting 801 is "disabled", in step S1110, the image forming apparatus 102 stores the reserved print job in the storage unit 303. In this case, in step S1108, the reserved print job is displayed in the reserved print job list.

Next, reception of the reserved print job by the image forming apparatus 102 is described with reference to a flowchart in FIG. 8. A program for executing processing regarding the flowchart in FIG. 8 is stored in the RAM 302 or the storage unit 303 in FIG. 2, read out to the RAM 302, and executed by the CPU 301.

In step S1205, the print job control unit 502 receives the print job 600 transmitted from the information processing apparatus 101 and stores the print job 600 in the RAM 302. The print job received in this step is regarded as the document 3. Upon completion of the processing in step S1205, the processing proceeds to step S1206.

In step S1206, the print job control unit 502 checks whether the reserved print setting information 603 in the print job 600 stored in the RAM 302 in step S1205 includes a setting of the reservation time.

If the reserved print setting information 603 includes the setting of the reservation time, the print job control unit 502 determines that the print job 600 is the reserved print job (YES in step S1206), and the processing proceeds to step S1207. If the reserved print setting information 603 does not include the setting of the reservation time, the print job control unit 502 determines that the print job 600 is the normal print job (NO in step S1206), and the processing proceeds to step S1225.

First, a case where the print job control unit 502 determines, in step S1206, that the received print job 600 is the normal print job (the processing proceeds to step S1225) is described.

In step S1225, the restriction control unit 501 obtains the function restriction information 810 stored in the storage unit 303 and stores the function restriction information 810 in the RAM 302. Upon completion of the processing in step S1225, the processing proceeds to step S1211.

In step S1211, the restriction control unit 501 detects whether the function restriction setting 801 stored in the RAM 302 in step S1225 is set to enabled (ON) or disabled (OFF). If the restriction control unit 501 detects that the function restriction setting 801 is set to disabled (OFF) (NO in step S1211), the processing proceeds to step S1212.

In step S1212, the print processing unit 504 executes the print job 600 received in step S1205 as the normal job. Specifically, in step S1205, the print processing unit 504 interprets PDL data of the print job 600 stored in the RAM 302 and supplies the printing unit 308 with the PDL data as bit map image data. Subsequently, the printing unit 308 performs printing.

In step S1211, if the function restriction setting 801 is enabled (ON) (YES in step S1211), the processing proceeds to step S1213.

In step S1213, the print job control unit 502 obtains the job owner name 602 of the print job stored in the RAM 302 in step S1205. Further, the print job control unit 502 detects whether the advanced setting 809 corresponding to the job owner includes the enabled print prohibition setting from the function restriction information 810 stored in the RAM 302 in step S1206.

In step S1213, if the print prohibition setting 802 in FIG. 6 is enabled (YES in step S1213), the processing proceeds to step S1210, and the print job is cancelled. Alternatively, if at least one of the print settings same as the print settings included in the print setting information 604 included in the print job is enabled (YES in step S1213), the processing proceeds to step S1210, and the print job is cancelled. Specifically, such a case includes a case where at least one of the color print prohibition setting 803 and the 1-in-1 print prohibition setting 805 is enabled in a case where the print settings included in the print job are the color print setting and the 1-in-1 print setting.

Next, a case where the print job control unit 502 determines, in step S1206, that the received print job 600 is the reserved print job (the processing proceeds to step S1207) is described.

In step S1207, the restriction control unit 501 obtains the function restriction information 810 stored in the storage unit 303 and stores the function restriction information 810 in the RAM 302. Upon completion of the processing in step S1207, the processing proceeds to step S1208.

In step S1208, the restriction control unit 501 detects whether the function restriction setting 801 is set to enabled (ON) or disabled (OFF) in the function restriction information 810 stored in the RAM 302 in step S1207. In step S1208, if the restriction control unit 501 detects that the function restriction setting 801 is set to disabled (OFF) (NO in step S1208), the processing proceeds to step S1209.

In step S1209, the print job control unit 502 stores the print job 600 stored in the RAM 302 in step S1205 in the storage unit 303 as the reserved print job. Upon completion of the processing in step S1209, the processing proceeds to step S1230.

Figure 8:
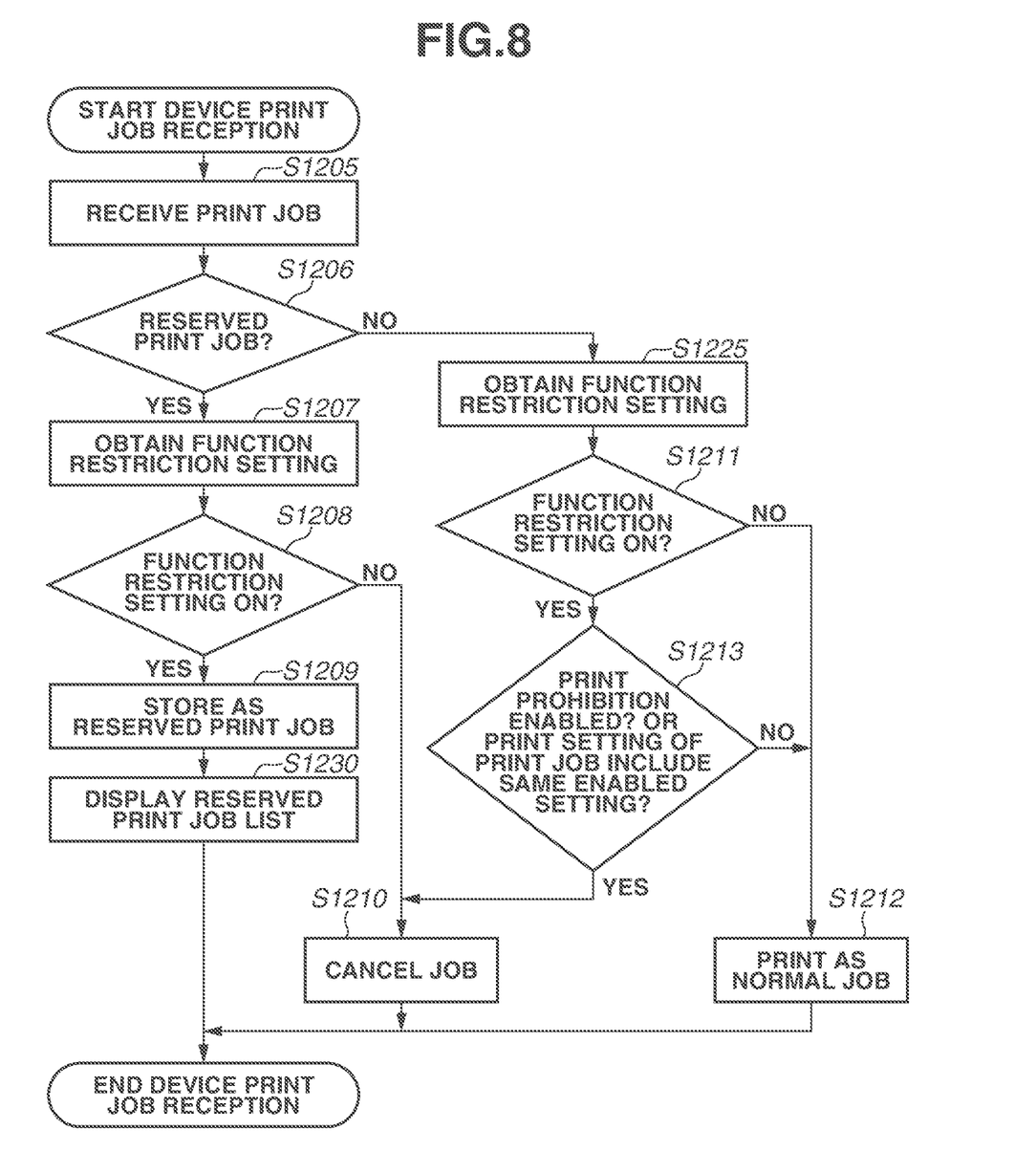
FIG. 8 is a flowchart illustrating reserved print processing by the image forming apparatus.
Figure 9A:
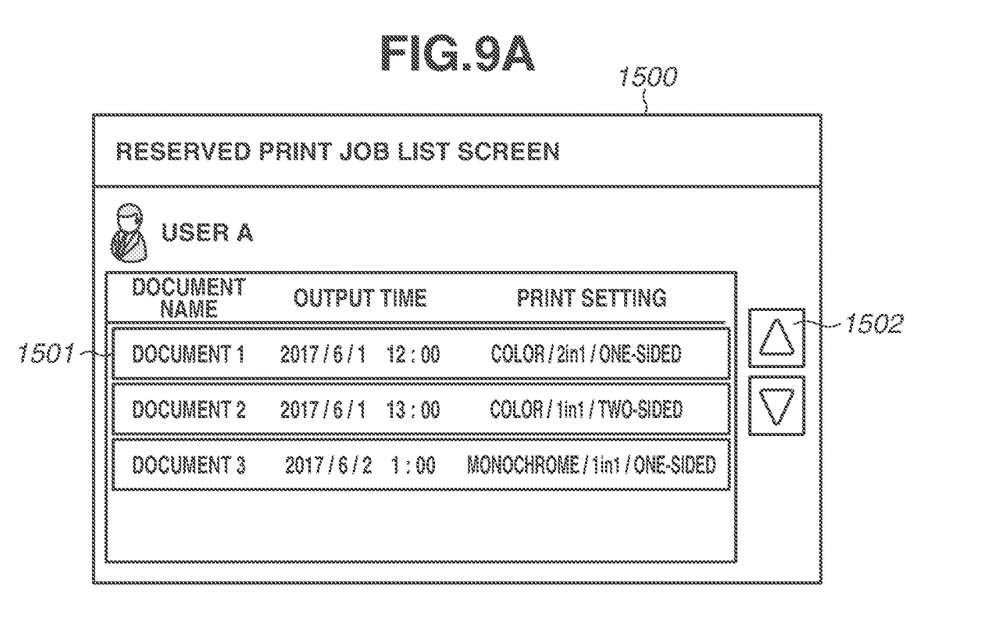
FIGS. 9A and 9B illustrate examples of a reserved print job list screen.
Figure 9B:
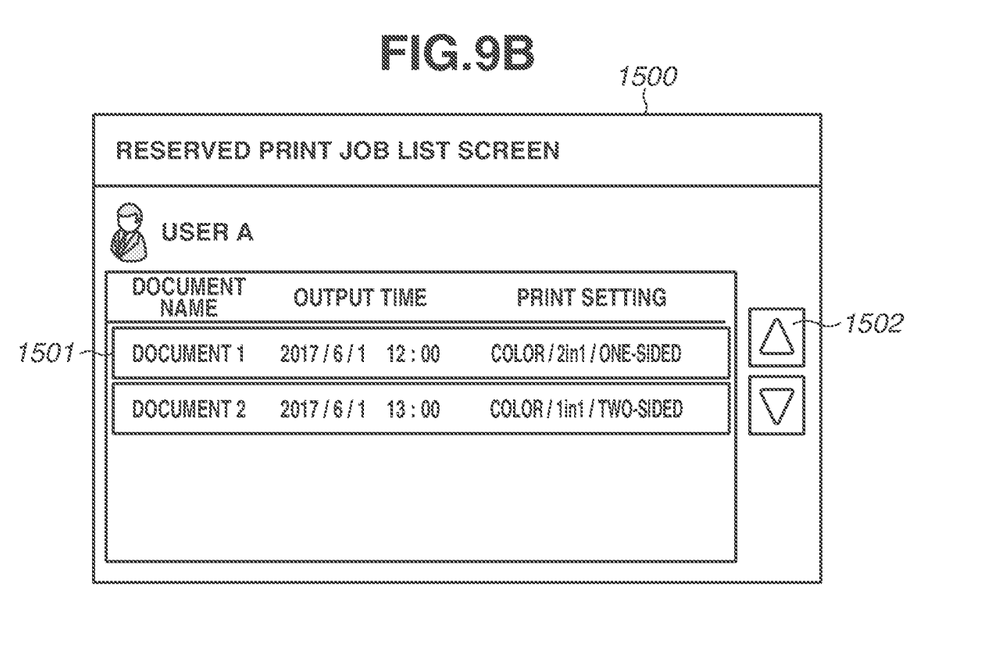

In step S1230, the CPU 301 causes the display unit 304 to display the reserved print job stored in the storage unit 303 on the reserved print job list screen 1500 illustrated in FIGS. 9A and 9B.

On the reserved print job list screen 1500, the user name and the reserved print job corresponding to the user name are displayed. The document name, the reservation time, and the print settings of the reserved print job are displayed in a display area 1501 of the reserved print job list screen 1500. The reserved print job stored in the storage unit 303 is added to the display area 1501.

In addition, scroll keys 1502 are displayed on the reserved print job list screen 1500. The scroll keys 1502 are keys for scrolling and displaying the reserved print job which is hidden in a case where the reserved print jobs cannot be fully displayed in the display area 1501.

Upon completion of the processing in step S1230, the processing in the flowchart for receiving the print job is terminated.

Figure 10:
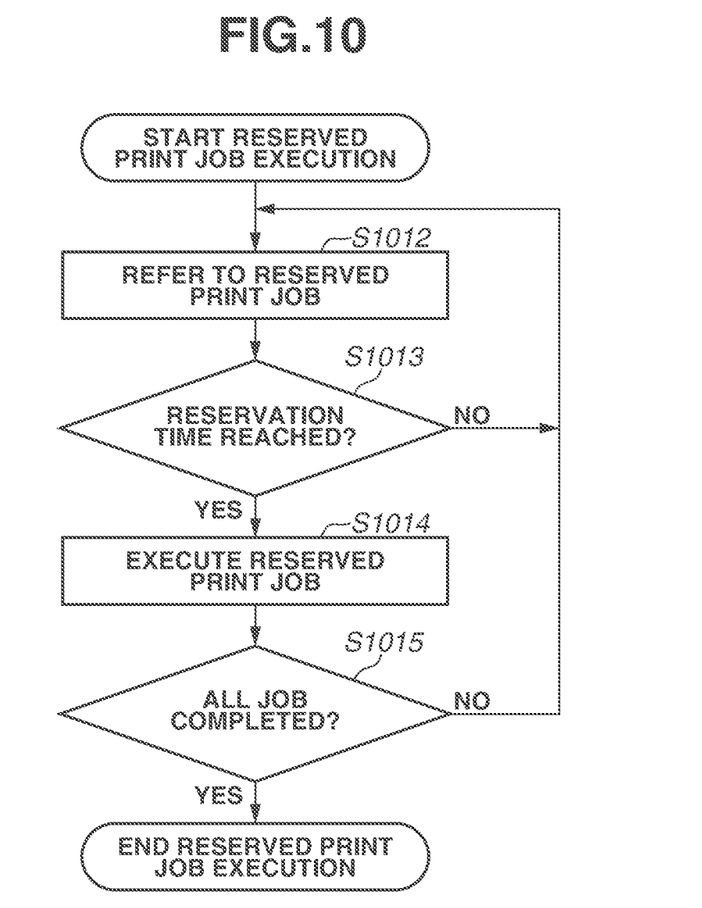
FIG. 10 is a flowchart illustrating execution of a reserved print job.

When the reservation time set to the reserved print job stored in the storage unit 303 comes after the processing in step S1230, the print job control unit 502 controls the print processing unit 504 to execute the reserved print job. FIG. 10 is a flowchart illustrating execution of the reserved print job.

In step S1012, the print job control unit 502 refers to one of the reserved print jobs stored in the storage unit 303 in step S1209. In step S1013, the time management unit 503 compares the time stored in the image forming apparatus 102 with the reservation time included in the reserved print setting information 603. As a result of the comparison, when the reservation time comes (YES in step S1013), the processing proceeds to step S1014, whereas when the reservation time has not come (NO in step S1013), the processing returns to step S1012.

In step S1014, the print processing unit 504 interprets the PDL data of the reserved print job stored by the print job control unit 502 in the storage unit 303 and supplies the printing unit 308 with the PDL data as the bit map image data. Subsequently, the printing unit 308 performs printing.

In step S1015, the print job control unit 502 determines whether reference of all of the reserved print jobs is completed. If reference of all of the reserved print jobs is not completed (NO in step S1015), the processing returns to step S1012, and the processing in steps S1012 to S1015 is repeated until reference of all of the reserved print jobs is completed. If reference of all of the reserved print jobs is completed (YES in step S1015), the processing in the flowchart for executing the reserved print job is terminated.

The processing in the flowchart for executing the reserved print job in FIG. 10 is performed at a predetermined interval. Specifically, it is executed, for example, every ten minutes. If all of the reserved print jobs stored in the storage unit 303 are executed, the processing in the flowchart for executing the reserved print job is not performed.

The description returns to that of FIG. 8. In step S1208, if the restriction control unit 501 detects that the function restriction setting 801 is set to enabled (ON) (YES in step S1208), the processing proceeds to step S1210.

In step S1210, the print job control unit 502 cancels the reserved print job (the document 3) received in step S1205. The cancelled reserved print job (the document 3) is not stored in the storage unit 303 and not displayed on the reserved print job list screen 1500 as illustrated in FIG. 9B.

Thus, the user who transmits the reserved print job can confirm that the reserved print job is cancelled before the reservation time by checking the reserved print job list screen.

Figure 11:
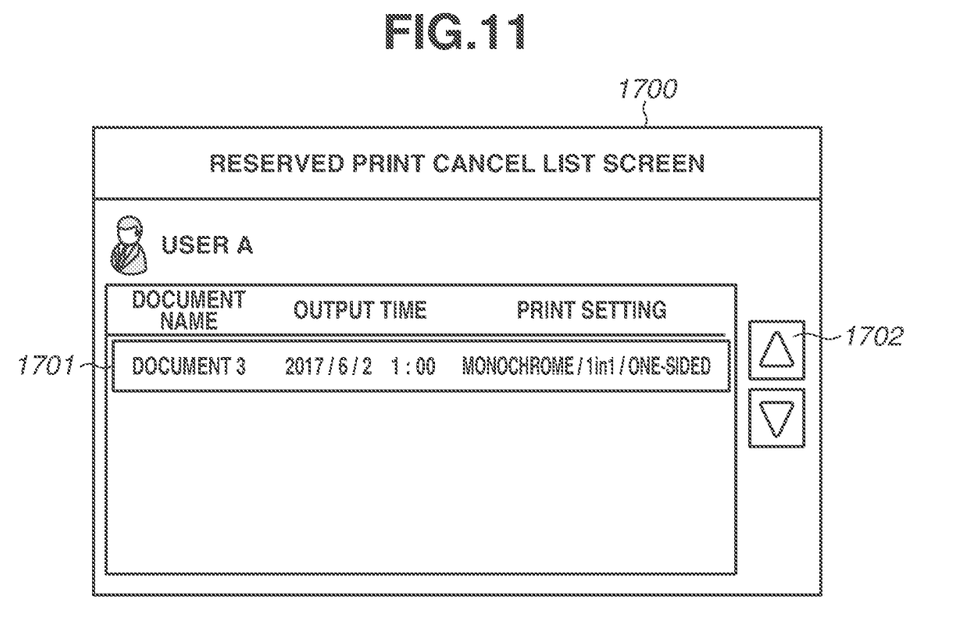
FIG. 11 illustrates an example of a cancel list screen.

In this regard, it may be configured that the reserved print job cancelled in step S1210 can be confirmed on a cancel list screen 1700 illustrated in FIG. 11.

The cancel list screen 1700 displays the user name and the reserved print job corresponding to the user name. The document name, the reservation time (the output time), and the print settings of the reserved print job are displayed in a display area 1701. Scroll keys 1702 are keys for scrolling and displaying the cancelled reserved print job which is hidden in a case where the cancelled reserved print jobs cannot be fully displayed in the display area 1701.

The cancelled reserved print job may be notified to the information processing apparatus 101 by an e-mail to the job owner of the reserved print job and may be notified by voice without limiting to the display on the cancel list screen 1700.

Further, the display unit 304 may display that the reserved print job is cancelled in response to cancellation of the reserved print job in step S1210. The display unit 304 may further display a reason of cancellation. Moreover, the image forming apparatus 102 may instruct the information processing apparatus 101 to display the cancellation. Upon completion of the processing in step S1210, the processing in the flowchart for receiving the print job is terminated.

The case in which the print job is cancelled is described as the configuration in which the reserved print job is disabled in step S1210, however, a case in which a reserved print job is retained in a storage apparatus, and printing is cancelled may be applied. In such a case, the reserved print job disabled in step S1210 is not displayed on the reserved print job list screen 1500.

As described above, according to the present exemplary embodiment, in a case where the function restriction is enabled in the image forming apparatus 102, the image forming apparatus 102 cancels the reserved print job before the reservation time and enables a user to confirm the cancellation by the reserved print job list. Accordingly, the user can find that the reserved print job is cancelled before the reservation time.

Figure 12:
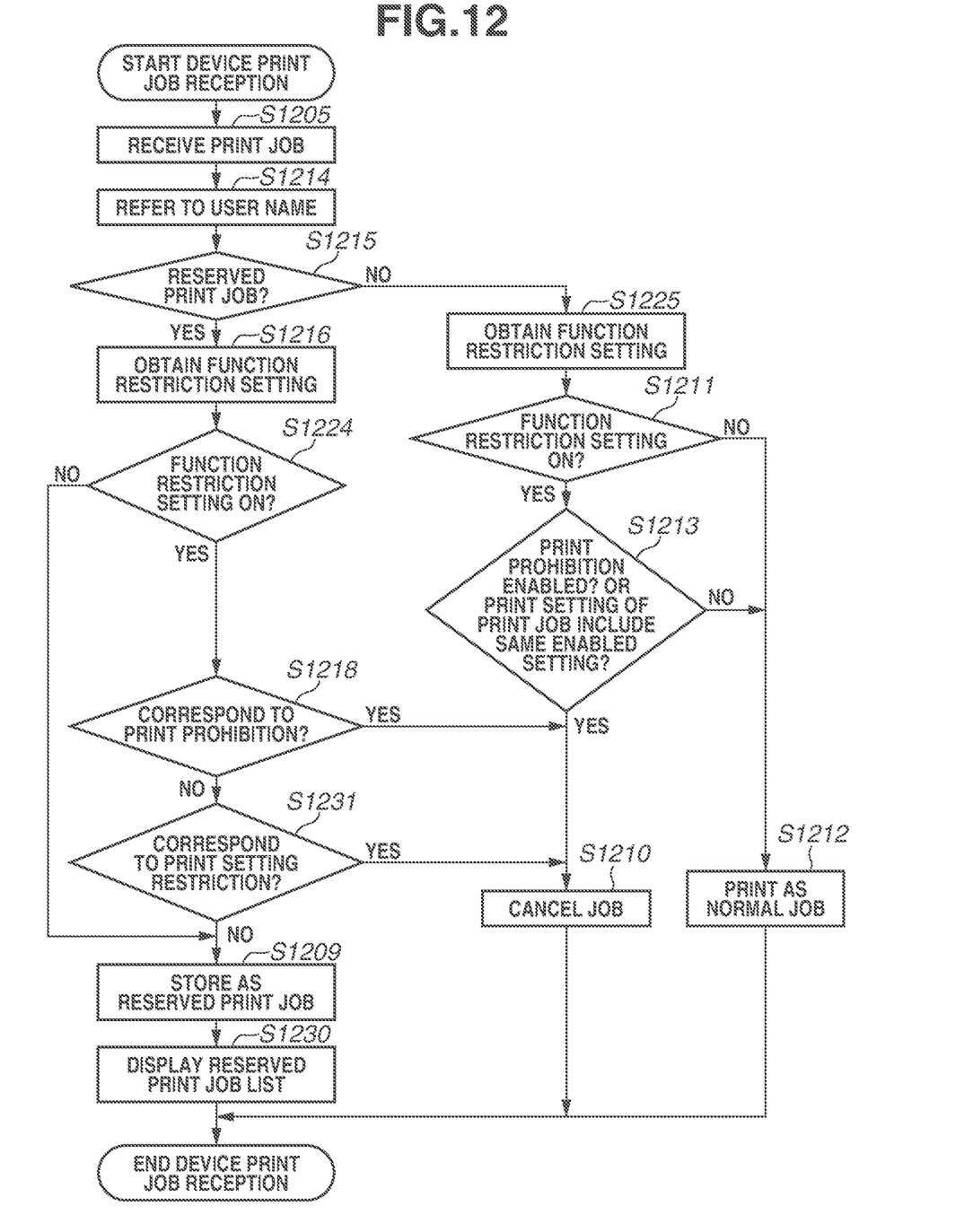
FIG. 12 is a flowchart illustrating reserved print processing by the image forming apparatus.

Reception of a reserved print job by an image forming apparatus according to a second exemplary embodiment is described with reference to a flowchart in FIG. 12. According to the first exemplary embodiment, the configuration is described in which the reserved print job is cancelled before the reservation time in a case where the function restriction setting 801 is enabled.

The present exemplary embodiment is different from the first exemplary embodiment in that in a case where the function restriction setting is enabled and the print prohibition setting included in the print settings corresponding to the job owner name of the reserved print job is enabled, the reserved print job is cancelled before the reservation time. Further, the present exemplary embodiment is different from the first exemplary embodiment in that in a case where the function restriction setting is enabled, the print prohibition setting is disabled, and the enabled prohibition setting is included in the print settings of the received reserved print job, the reserved print job is cancelled before the reservation time.

According to the present exemplary embodiment, the portions having functions similar to those described in FIGS. 1 to 11 are denoted by the same reference numerals, and the detailed description thereof is omitted.

In step S1214, the print job control unit 502 obtains the job owner name 602 of the print job 600 and stored the job owner name 602 in the RAM 302. Upon completion of the processing in step S1214, the processing proceeds to step S1215.

In step S1215, the print job control unit 502 determines whether the reserved print setting information 603 of the print job 600 stored in the RAM 302 in step S1205 includes the reservation time 702. If the reserved print setting information 603 does not include the reservation time 702 (NO in step S1215), the processing is similar to that according to the first exemplary embodiment, and thus the description thereof is omitted. If the reserved print setting information 603 includes the reservation time 702 (YES in step S1215), the processing proceeds to step S1216, whereas if the reserved print setting information 603 does not include the reservation time 702 (NO in step S1215), the processing proceeds to step S1225.

In step S1216, the restriction control unit 501 stores, in the RAM 302, the function restriction information regarding the user stored in the RAM 302 in step S1214 among the function restriction information pieces 810 which are selected on the setting screen 800 for the function restriction and stored in the storage unit 303. Upon completion of the processing in step S1216, the processing proceeds to step S1224.

In step S1224, the restriction control unit 501 detects whether the function restriction setting 801 is set to enabled (ON) or disabled (OFF) in the function restriction information 810 stored in the RAM 302 in step S1216. In step S1224, if the restriction control unit 501 detects that the function restriction setting 801 is set to disabled (OFF) (NO in step S1224), the processing proceeds to step S1209, and the reserved print job is stored in the storage unit 303.

Subsequently, in step S1230, the CPU 301 causes the display unit 304 to display the reserved print job stored in the storage unit 303 on the reserved print job list screen 1500 illustrated in FIG. 8. The detailed descriptions of steps S1209 and S1230 are similar to those according to the first exemplary embodiment.

In step S1224, if the restriction control unit 501 detects that the function restriction setting 801 is set to enabled (ON) (YES in step S1224), the processing proceeds to step S1218.

In step S1218, if the print prohibition setting 802 illustrated in FIG. 6 is enabled (YES in step S1218), the processing proceeds to step S1210, and the print job is cancelled. If the print prohibition setting 802 is disabled (NO in step S1218), the processing proceeds to step S1231.

In step S1231, if at least one of the prohibition settings corresponding to the print settings same as the print settings included in the print setting information 604 included in the print job is enabled (YES in step S1231), the processing proceeds to step S1210, and the print job is cancelled. Specifically, for example, it is a case where at least one of the color print prohibition setting 803 and the 1-in-1 print prohibition setting 805 is enabled in a case where the print settings included in the print job are the color print setting and the 1-in-1 print setting. The detailed description of step S1210 is similar to that according to the first exemplary embodiment.

In step S1231, the prohibition setting corresponding to the print settings same as the print settings included in the print setting information 604 included in the print job is disabled (NO in step S1231), the processing proceeds to step S1209. The descriptions of steps S1209 and S1230 are similar to those according to the first exemplary embodiment.

According to the present exemplary embodiment, in a case where the function restriction setting is enabled and the print prohibition setting included in the print settings corresponding to the job owner name of the reserved print job is enabled, the reserved print job is cancelled before the reservation time. Further, in a case where the function restriction setting is enabled, the print prohibition setting is disabled, and the enabled prohibition setting is included in the print settings of the received reserved print job, the reserved print job is cancelled before the reservation time.

Accordingly, even if the function restriction setting is enabled, the reserved print job can be stored in a case where the enabled setting is not included in the print settings in the advanced setting 809. Further, in a case where the enabled setting is included in the print settings in the advanced setting 809, the reserved print job can be cancelled before the reservation time. In addition, a user can confirm that the reserved print job is cancelled by the reserved print job list.

In step S1213, determination in steps S1218 and S1231 is performed in one step, however, the processing may be divided into two steps as in steps S1218 and S1231. The same can be applied to the first exemplary embodiment.

Further, in steps S1218 and S1231, whether the enabled setting is included in the print settings in the advanced setting 809 associated with a user may be determined in one step, and in a case where the enabled setting is included, the processing may proceed to step S1210. The same can be applied to step S1213.

Further, in step S1215, the function restriction information regarding a user may be the function restriction directly associated with the user. Furthermore, in a case of a user group which sets a plurality of user as a group, the function restriction information regarding a user may be the function restriction associated with the user group to which the user belongs. Specifically, the user groups include, for example, an administrator group having an administrator authority of the image forming apparatus and a general user group to which a predetermined authority is granted by the administrator.

According to the above-described exemplary embodiments, in a case where the function restriction setting is enabled in the image forming apparatus, a user can recognize that a reserved print job is not executed before a reservation time comes, and thus user operability can be improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-015724, filed Jan. 31, 2018, which is hereby incorporated by reference herein in its entirety.

What is claimed is:

1. A printing apparatus which receives a reserved print job of which a printing time is specified and executes printing based on the reserved print job at the specified printing time, the printing apparatus comprising:
one or more memories; and
one or more processors that execute a set of instructions to:
set a use restriction for at least one function of the printing apparatus by a user; and
restrict execution of a print job which is received in a state in which the use restriction is set to enabled and of which a printing time is not specified based on the set use restriction, and
perform control not to execute a reserved print job which is received in a state in which the use restriction is set to enabled.

2. The printing apparatus according to claim 1, wherein a reserved print job which is received in a state in which the use restriction is set to enabled is canceled regardless of the set use restriction.

3. The printing apparatus according to claim 2, wherein the reserved print job is canceled before a printing time specified to the reserved print job.

4. The printing apparatus according to claim 1, wherein the one or more processors further execute the set of instructions to store a reserved print job which is received in a state in which the use restriction is set to disabled as a reserved print job,
wherein control to execute the reserved print job stored in the storage unit is performed based on a printing time specified to the reserved print job.

5. The printing apparatus according to claim 1, wherein the one or more processors further execute the set of instructions to determine whether the use restriction is set to enabled or disabled in response to reception of a print job, wherein control regarding the received print job is performed based on a result of determining whether the use restriction is set to enabled or disabled.

6. The printing apparatus according to claim 1, wherein the one or more processors further execute the set of instructions to display a list of reserved print jobs which are not executed.

7. The printing apparatus according to claim 6, wherein at least a job name and a printing time of the reserved print job are displayed.

8. The printing apparatus according to claim 1, wherein the use restriction includes one or more of prohibition of color printing, prohibition of one-sided printing, and prohibition of 1-in-1 printing.

9. A method for controlling a printing apparatus which receives a reserved print job of which a printing time is specified and executes printing based on the reserved print job at the specified printing time, the method comprising:
setting a use restriction for at least one function of the printing apparatus by a user;
restricting execution of a print job which is received in a state in which the use restriction is set to enabled and of which a printing time is not specified based on the set use restriction; and
performing control not to execute a reserved print job which is received in a state in which the use restriction is set to enabled.

10. The method according to claim 9, further comprising:
canceling a reserved print job which is received in a state in which the use restriction is set to enabled regardless of the set use restriction.

11. The method according to claim 10, further comprising:
canceling the reserved print job before a printing time specified to the reserved print job.

12. The method according to claim 9, further comprising:
storing, in a storage, a reserved print job which is received in a state in which the use restriction is set to disabled as a reserved print job; and
executing the reserved print job that is stored based on a printing time specified to the reserved print job.

13. The method according to claim 9, further comprising:
determining whether the use restriction is set to enabled or disabled in response to reception of a print job; and
performing control regarding the received print job based on a result of the determination.

14. The method according to claim 1, further comprising:
displaying, on a display, a list of reserved print jobs which are not executed.

15. The method according to claim 14, wherein the displayed list includes at least a job name and a printing time of the reserved print job.

16. The method according to claim 1, wherein the use restriction includes one or more of prohibition of color printing, prohibition of one-sided printing, and prohibition of 1-in-1 printing.

* * * * *